United States Patent [19]

Mylonakis

[11] 4,244,850

[45] Jan. 13, 1981

[54] AIR CURABLE LATEX

[75] Inventor: Stamatios G. Mylonakis, Barrington, Ill.

[73] Assignee: DeSoto, Inc., Des Plaines, Ill.

[21] Appl. No.: 7,516

[22] Filed: Jan. 29, 1979

Related U.S. Application Data

[63] Continuation-in-part of Ser. No. 901,856, May 1, 1978, abandoned.

[51] Int. Cl.$^3$ .............................................. C08L 33/02
[52] U.S. Cl. .............................................. 260/29.6 M
[58] Field of Search ................ 260/29.6 M, 29.6 MM, 260/29.2 E, 29.2 UA, 29.6 H

[56] References Cited

U.S. PATENT DOCUMENTS

| | | | |
|---|---|---|---|
| 3,547,849 | 12/1970 | Kennedy | 260/29.2 UA |
| 3,629,169 | 12/1971 | Bedighian | 260/29.2 UA |
| 3,950,287 | 4/1976 | Coats | 260/29.6 MM |
| 3,988,272 | 10/1976 | Watts | 260/29.6 MM |
| 4,033,920 | 7/1977 | Isozaki | 260/29.6 H |
| 4,077,931 | 3/1978 | Leitheiser | 260/29.6 MM |

*Primary Examiner*—Paul R. Michl
*Attorney, Agent, or Firm*—Dressler, Goldsmith, Shore, Sutker & Milnamow, Ltd.

[57] ABSTRACT

An air drying and air curable latex coating composition is provided in which water has dispersed therein unsaturated resin particles, and these are combined with an emulsion of drier salt in solution in water immiscible organic solvent. The unsaturated resin particles are preferably aqueous emulsion copolymer particles including from 1% to 20% by weight of a monoethylenically unsaturated monomer carrying a reactive group selected from carboxyl or 1,2-epoxy, a portion of the selected reactive groups in the emulsion copolymer particles being reacted in the latex with a monoethylenically unsaturated monomer carrying one of the other of said reactive groups to provide unsaturated groups on said latex particles.

13 Claims, No Drawings

AIR CURABLE LATEX

DESCRIPTION

This application is a continuation-in-part of my prior application Ser. No. 901,856 filed May 1, 1978 now abandoned.

TECHNICAL FIELD

This invention relates to aqueous latex coating compositions which dry in air and which cure on exposure to air, even at ambient temperature, to increase the solvent resistance and other properties of the coatings.

BACKGROUND ART

Aqueous latex coating compositions, both clear and pigmented, are in wide use, the latex particles being provided by aqueous emulsion copolymerization of monoethylenically unsaturated monomers. These are generally thermoplastic from the standpoint that the deposited and air dried coatings dissolve easily in organic solvents, such as methyl ethyl ketone. When monomers providing cure capacity are present, the cure frequently requires a bake, and this largely limits curable coatings to industrial situations where baking capacity is available. When polyethylenically unsaturated monomers are included in the monomer mixture in the hope of obtaining residual unsaturation for subsequent cure after application, it is difficult to avoid premature consumption of all the unsaturation which impairs the capacity of the latex particles to coalesce and adhere to the coated substrate. In any event, utilization of the residual unsaturation to improve properties raises its own difficulties.

It is also known to employ driers to air cure unsaturated resins, but this is done in organic solvent solution, not in aqueous emulsion.

In my prior application Ser. No. 901,856 now abandoned, I provided an air drying latex coating composition containing unsaturated groups on the latex particles, but these were used to provide an ultraviolet light cure, particularly in the presence of appropriate photosensitizers. However, pigmentation of ultraviolet light-curing systems is difficult because most pigments are opaque to such light.

DISCLOSURE OF INVENTION

In this invention, an air drying and air curable latex coating composition is provided in which water has dispersed therein unsaturated resin particles, and these are combined with an emulsion of drier salt in solution in water immiscible organic solvent. The unsaturated resin particles are preferably copolymer particles provided by the aqueous emulsion copolymerization of monoethylenically unsaturated monomers, these monomers including from 1% to 20% by weight of a monoethylenically unsaturated monomer carrying a reactive group selected from carboxyl or 1,2-epoxy, and the balance of the monomers consisting essentially of nonreactive monomers, a portion of the selected reactive groups in the emulsion copolymer particles being reacted in the latex with a monoethylenically unsaturated monomer carrying one of the other of said reactive groups to provide unsaturated groups on said latex particles. Since ultraviolet cure is not relied on (though some photoinitiated cure may occur) the latex may be pigmented as desired.

The term nonreactive, as applied to the monomers discussed above, denotes the incapacity for reaction under the conditions of polymerization. This is because reaction between the functional groups other than the ethylenic groups of the monoethylenic monomers tends to cross-link the copolymer and this interferes with the capacity of the latex particles to flow together and adhere to the base on air drying. However, up to about 3% of the copolymer may be constituted by reactive groups of diverse nature to improve adhesion as is well known, and such inclusion is contemplated by the language "consisting essentially of". These reactive monomers which improve adhesion when present in small amount are illustrated in U.S. Pat. Nos. 3,356,653; 3,356,654; 3,356,655; and 3,509,085.

When the emulsion copolymer contains carboxyl functionality, the latex at elevated temperature has added thereto a monoethylenically unsaturated monoepoxide, such as glycidyl acrylate or methacrylate, particularly the latter because of its availability. While acrylates and methacrylates are preferred, cinnamates, crotonates, itaconates and norbornenyl esters and ethers with the glycidyl group are also useful.

The reaction between the epoxy group and the carboxyl group is an adduction reaction which proceeds easily at temperatures of about 30° C. to about 100° C., especially at about 50° C.–90° C., particularly in the presence of a quaternary ammonium salt, here illustrated by tetraethyl ammonium bromide. The catalysis of this reaction with numerous amines is common knowledge in the art, and a catalyst is normally necessary to force the esterification reaction.

It is preferred to employ a stoichiometric deficiency of the unsaturated monoepoxide in order to leave some acid in the copolymer functionality, but this is not essential. Excess epoxide is tolerable, but is preferably avoided since it is wasteful and introduces residual unpolymerized monomer which is undesirable. At least about 0.5% of the unsaturated monoepoxide, base on the weight of the copolymer is desirably used. Based on the acid content of the copolymer, it is preferred to consume at least 5% of it, preferably from 10% to 90% thereof, and more preferably 50%–85% of the acid (carboxyl) by reaction with the monoepoxide.

The epoxide group reacts with the carboxyl group without organic solvent being present, but some water immiscible organic solvent, such as xylene, can be added, though it is not needed and is preferably avoided. Water miscible solvents, like the glycols used to enhance freeze-thaw stability, may also be present.

A free radical polymerization inhibitor, such as hydroquinone, may be added with the unsaturated epoxide to minimize premature polymerization. These inhibitors are also well known.

The unsaturated epoxide must be a monoepoxide when it is reacted with the carboxyl-functional copolymer to avoid cross-linking. Similarly, if we prepare an epoxy-functional copolymer, then the unsaturated carboxylic monomer must be a monocarboxylic acid. Conversely, when the unsaturated acid or epoxide is incorporated into the copolymer by copolymerization, then it can be a polyepoxide or a polycarboxylic acid. Monoethylenic polyepoxides are not now available in commerce, but they can be prepared. Monoethylenic polycarboxylic acids are readily available in commerce, such as maleic acid, fumaric acid, itaconic acid, citraconic acid, and the like.

Unsaturated epoxides useful for forming epoxy-functional emulsion copolymers are illustrated by glycidyl acrylate, glycidyl methacrylate, glycidyl cinnamate, and allyl glycidyl ether. The proportions now would be the same as before, but reversed. The epoxide monomer would be used in an amount of 1–20% of total monomers, and at least about 0.5% of monocarboxylic acid would be reacted with the copolymer. The presence of excess acid is more tolerable than excess epoxide was in the preferred system.

The term "air drying" means that the $T_g$ (glass transition temperature) of the copolymer is low enough to enable the latex particles to coalesce at normal room temperature when the latex is filmed on a support and allowed to dry. The $T_g$ is normally calculated from the known properties of homopolymers produced from the monomer components. The $T_g$ of copolymers of interest herein is thus desirably below 20° C., more usually below 5° C., and is preferably in the range of 5° C. to −20° C. The reaction with the unsaturated reactive monomer does not materially change the $T_g$ of the copolymer because the reaction simply generates side chains. Some premature chain extension or cross-linking may occur, and this increases the $T_g$, but very little occurs in preferred practice. Also, small amounts of high boiling solvents effectively reduce the $T_g$ to promote air drying, as is well known.

The usual nonreactive monomers which constitute the balance of the copolymer contain the single ethylenic group and no other functional group. Illustrative monomers are ethyl acrylate, butyl methacrylate, methyl methacrylate, vinyl acetate, and ethylene. Illustrative copolymers are illustrated in the examples herein, and also in the patents referred to earlier.

Aqueous emulsion copolymerization is itself well known and described in the patents noted earlier. This polymerization is carried out in usual fashion in the absence of the monomer providing an unsaturated product, such monomer being incorporated by a post reaction with the emulsified copolymer particles. The drier salts are added after this post reaction has been completed.

Drier salts for air curing unsaturated oils and alkyd resins are common knowledge. Suitable driers are illustrated in the examples, but octoates and oleates and the like are also useful. Proportions are also conventional, from 0.1% to 10%, preferably from 0.5% to 3%, based on the copolymer solids may be used herein. Thus, drier selection proportion are not prime features of this invention which instead relies upon the emulsion form of the drier and the latex and the preferred copolymer structure.

In preferred practice, the drier salts are used in admixture with one another, as is known, and they are employed by dissolving them in water immiscible organic solvents and then emulsifying the solution of the drier salts into water (or into the copolymer emulsion) with the aid of surfactants which, while broadly of any character, are preferably nonionic surfactants to minimize disturbing the unsaturation present, and to minimize the introduction of water sensitivity into the final cured film. The aqueous emulsion of drier salts (which is usually prepared separately) is then mixed into the latex emulsion. Pigment suspensions can be mixed in as desired, as is customary in the provision of emulsion paints, without disturbing the cure capacity of the emulsion after it has been filmed upon a substrate and allowed to air dry. The drier emulsion can be added to the copolymer emulsion before or after pigmentation.

Appropriate organic solvents which are essentially insoluble in water are illustrated by mineral spirits, which is preferred, and by xylene and hexoxy ethanol. Total insolubility in water is not required to enable emulsification in water.

BEST MODE FOR CARRYING OUT THE INVENTION

EXAMPLE 1

| Grams | |
|---|---|
| | Monomer Emulsion |
| 25.64 | Butyl acrylate |
| 17.25 | Methyl methacrylate |
| 3.73 | Methacrylic acid |
| 2.23 | Sodium dodecyl benzene sulfonate (23% in water) [The sulfonate solution is the surfactant. Siponate DS-4 (23%) supplied by Alcolac Incorporated may be used] |
| 12.67 | Deionized water |
| | Kettle Charge |
| 30.31 | Deionized water |
| 0.31 | Sodium dodecyl benzene sulfonate (23% in water) |
| 0.05 | Sodium bicarbonate |
| 2.59 | Monomer Emulsion |
| 0.19 | Sodium persulfate |
| 1.29 | Deionized water |
| | Initiator Solution |
| 0.01 | Sodium formaldehyde sulfoxylate |
| 0.13 | Ferrous sulfate (0.15%) |
| | Unsaturated Monomer Solution |
| 0.05 | Hydroquinone |
| 0.09 | Tetraethylammonium bromide |
| 4.62 | Glycidyl methacrylate |

The monomer emulsion is premixed so that a small proportion thereof can be added to the kettle charge. The kettle charge is provided by adding 30.31 grams of deionized water to a five liter four neck flask and heating to 80° C. The remaining materials in the kettle charge are then added and the initiator solution is added dropwise until an exotherm is noted and the temperature of 80° C. is maintained for 30 minutes. The remaining monomer emulsion is then added and the emulsion is maintained at 80° C. for 2.5 hours.

To ensure completion of the reaction, the reaction temperature was maintained at 80° C. and portions of the initiator solution are added twice followed by maintaining the temperature for 30 minutes in each instance.

The reaction with glycidyl methacrylate may be carried out in the presence of light since, in the absence of photosensitizer very little cross-linking takes place, but the flask can be shielded against ultraviolet light if desired. The mixture of hydroquinone, tetraethylammonium bromide and glycidyl methacrylate is added and the reaction mixture is held for 30 minutes at 80° C. The flask is then cooled and the emulsion filtered through a 100 mesh screen.

EXAMPLE 2

| Grams | Component |
|---|---|
| 100 | Latex of Example 1, 50% solids |
| 1.5 | Nonyl phenoxy poly(ethyleneoxy) ethanol [9 moles of ethylene oxide per mol of phenol] GAF Corporation product Igepal CO-630 may be used |
| 1.0 | Cobalt naphthenate drier (6% solution in mineral spirits) |

-continued

| Grams | Component |
|---|---|
| 1.0 | Manganese naphthenate drier (6% solution in mineral spirits) |
| 0.5 | Zirconium naphthenate drier (12% solution in mineral spirits) |

Using an overhead stirrer with low speed, 100 grams of the latex are mixed slowly with the driers which have previously been thoroughly mixed with the nonionic surfactant. Mixing is continued for approximately 30 minutes. The resulting mixture is then drawn down on aluminum and paper substrates to provide a dry thickness of from one to two mils. The applied films were air dried for a period of 30 days and the film were evaluated at periodic intervals. The water resistance, hardness and adhesion were observed, and it was seen that these gradually improved to possess the properties of cured alkyd coatings.

EXAMPLE 3

| Grams | Component |
|---|---|
| 87.9 | Deionized water |
| 202.9 | Titanium dioxide, rutile |
| 8.9 | Sodium salt of polymalonic acid (25% water solution) as a dispersing agent. The commercial dispersing agent Tamol 731 of Rohm and Haas may be used if desired. |
| 8.9 | Octyl phenoxy poly(ethyleneoxy) ethanol [10 moles of ethylene oxide per mol of phenol] The commercial nonionic surfactant Triton X100 of Rohm and Haas may be used if desired. |
| 0.9 | Silica hydrophobe defoaming agent. The product Drew L475 of Drew Chemical Company may be used if desired. |

The above components are mixed at low speed with an overhead stirrer to provide a pigment dispersion to which is added, with low speed mixing, the following emulsion.

| Grams | Component |
|---|---|
| 3.5 | Nonionic surfactant in Example 2 |
| 4.0 | Cobalt drier in Example 2 |
| 4.0 | Manganese drier in Example 2 |
| 2.0 | Zirconium drier in Example 2 |
| 416.6 | Latex of Example 1 |
| 0.5 | Defoaming agent in Example 2 |
| 151.1 | Deionized water |

The above emulsion may desirably be thickened. An appropriate cellulosic thickener which may be used is hydroxy ethyl cellulose. The commercial thickener 250 MHBR of Hercules is useful.

The resulting paint air dries in less than about 10 minutes and air cures within about one week. The properties have been measured after 30 days and found to have the same chemical resistance, water resistance, hardness and adhesion properties normally associated with cured alkyd resins.

It is particularly noted that alkyd resins are normally applied from organic solvent solution and that the final film is a fatty acid-containing polyester, so it has the color and color retention and other characteristics associated with such materials. In contrast, the invention is a simple aqueous latex having all of the ease of application and ease of clean-up which characterize such products, and it also provides the characteristics normally associated with acrylic copolymers. This combination of latex application and low solvent content, acrylic characteristic, and air cure to the performance level of cured alkyd resins is obviously attractive, and it provides paints for trade sales and industrial applications.

I claim:

1. An air drying and air curable latex coating composition comprising water having dispersed therein unsaturated resin particles which are aqueous emulsion copolymer particles having ethylenically unsaturated side chains thereon, and a drier salt in solution in a water immiscible organic solvent emulsified in said latex.

2. An air drying and air curable latex coating composition as recited in claim 1 in which said drier salt solution is emulsified in said latex by means of a nonionic surfactant.

3. An air drying and air curable latex coating composition comprising water having dispersed therein copolymer particles provided by aqueous emulsion copolymerization of monoethylenically unsaturated monomers, said monomers including from 1% to 20% by weight of a monoethylenically unsaturated monomer carrying a reactive groups selected from carboxyl or 1,2-epoxy and the balance of said monomers consisting essentially of nonreactive monomers, at least a portion of the selected reactive groups in the emulsion copolymer particles produced by said copolymerization being reacted in the latex with a monoethylenically unsaturated monomer carrying one of the other of said reactive groups to provide unsaturated groups on said latex particles, and a drier salt in solution in a water immiscible organic solvent emulsified in said latex.

4. An air drying and air curable latex coating composition as recited in claim 3 in which said organic solvent is mineral spirits and said drier salt solution is emulsified by means of a nonionic surfactant.

5. An air drying and air curable latex coating composition as recited in claim 3 in which the reactive monomer carries the carboxyl and at least 5% of the copolymer acidity is consumed by reaction with monoethylenically unsaturated monoepoxide.

6. An air drying and air curable latex coating composition as recited in claim 5 in which said monoethylenically unsaturated monoepoxide is used in stoichiometric deficiency with respect to the carboxyl groups in the copolymer, said epoxide functionality being consumed in the reaction with the excess carboxyl functionality.

7. An air drying and air curable latex coating composition as recited in claim 6 in which 10% to 90% of the carboxyl functionality is consumed by reaction with said monoepoxide and said monoepoxide is used in an amount of at least about 0.5% based on the weight of the copolymer.

8. An air drying and air curable latex coating composition as recited in claim 3 in which said drier salt is present in an amount of from 0.1% to 10% based on the weight of copolymer.

9. An air drying and air curable latex coating composition as recited in claim 8 in which said copolymer has a $T_g$ in the range of 5° C. to −20° C., and said drier salt is present in an amount of from 0.5% to 3% based on the weight of copolymer.

10. A method of producing an air drying and air curable latex coating composition comprising copolymerizing monomers including monomers carrying a reactive group in aqueous emulsion to provide a latex of copolymer particles containing said reactive groups, adding to said latex a monoethylenically unsaturated monomer carrying a functional group reactive with the reactive group in said copolymer particles and then causing reaction to provide unsaturated side chains on said copolymer particles, and then incorporating in said latex a solution of drier salt dissolved in a water immiscible organic solvent to cause said solution to be emulsified into the latex.

11. A method as recited in claim 11 in which nonionic surfactant is added to said drier salt solution before the same is incorporated in said latex.

12. A method as recited in claim 11 in which said solution of drier salt is preemulsified into water with the aid of a nonionic surfactant, and the preemulsion is added to said latex.

13. A method of producing an air drying and air curable latex coating composition comprising providing a latex of copolymer particles produced by aqueous emulsion compolymerization of monoethylenically unsaturated monomers said copolymer particles having unsaturated side chains thereon, and then incorporating in said latex a solution of drier salt dissolved in a water immiscible organic solvent to cause said solution to be emulsified into the latex.

* * * * *

UNITED STATES PATENT OFFICE
CERTIFICATE OF CORRECTION

Patent No. 4,244,850  Dated Jan. 13, 1981

Inventor(s) Stamatios G. Mylonakis

It is certified that error appears in the above-identified patent and that said Letters Patent are hereby corrected as shown below:

First page, item [63] line 2, delete "abandoned"

Col. 2, line 40, change "base" to --based--

Col. 7, lines 8 and 11, change "claim 11" to --10--

Signed and Sealed this

Nineteenth Day of May 1981

[SEAL]

Attest:

RENE D. TEGTMEYER

Attesting Officer   Acting Commissioner of Patents and Trademarks